US010616781B2

(12) United States Patent
Mitchell et al.

(10) Patent No.: US 10,616,781 B2
(45) Date of Patent: Apr. 7, 2020

(54) DEVICE-BASED DIAGNOSTIC NETWORK TESTING

(71) Applicant: T-Mobile USA, Inc., Bellevue, WA (US)

(72) Inventors: Michael J. Mitchell, North Bend, WA (US); Peter P. Myron, Renton, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/622,807

(22) Filed: Jun. 14, 2017

(65) Prior Publication Data

US 2018/0368010 A1 Dec. 20, 2018

(51) Int. Cl.
*H04W 24/06* (2009.01)
*H04W 24/04* (2009.01)
*H04L 12/24* (2006.01)
*H04L 12/26* (2006.01)
*H04W 24/10* (2009.01)

(52) U.S. Cl.
CPC ......... *H04W 24/06* (2013.01); *H04L 41/0645* (2013.01); *H04L 41/0677* (2013.01); *H04L 43/50* (2013.01); *H04W 24/04* (2013.01); *H04L 41/50* (2013.01); *H04L 43/0817* (2013.01); *H04W 24/10* (2013.01)

(58) Field of Classification Search
CPC ..... H04W 24/06; H04W 24/04; H04W 24/10; H04L 41/0677; H04L 41/50; H04L 43/0817
See application file for complete search history.

(56) References Cited

U.S. PATENT DOCUMENTS 6,970,924 B1 * 11/2005 Chu ..................... H04L 41/5067
709/224
7,912,967 B2 3/2011 Mace et al.
(Continued)

FOREIGN PATENT DOCUMENTS

WO WO2014176243 10/2014

OTHER PUBLICATIONS

Google Scholar Search Results.*
(Continued)

*Primary Examiner* — Qun Shen
(74) *Attorney, Agent, or Firm* — Lee & Hayes, P.C.

(57) ABSTRACT

A cellular communications network is supported by an infrastructure that has many different parts. A fault management system can be used to monitor status and faults of the infrastructure. In response to certain types of faults, the fault management system initiates diagnostic testing, which may be performed using one or more communication devices such as those that might commonly be used in conjunction with the cellular communications network. One type of test might consist of installing an application on a communication device and measuring responsiveness of the application. The application is selected as one that relies at least in part on communicating through the cellular communications network. The responsiveness of the application may therefore be relevant to evaluating network performance and infrastructure status.

19 Claims, 5 Drawing Sheets

(56) References Cited

U.S. PATENT DOCUMENTS

| | | | |
|---|---|---|---|
| 9,547,584 B2 | 1/2017 | Acharya et al. | |
| 9,703,686 B2 | 7/2017 | dos Santos et al. | |
| 9,703,691 B1* | 7/2017 | Yim | G06F 11/3688 |
| 2004/0088405 A1* | 5/2004 | Aggarwal | H04L 41/069 |
| | | | 709/224 |
| 2005/0089028 A1 | 4/2005 | Hopkins | |
| 2008/0104575 A1* | 5/2008 | Fan | G06F 11/36 |
| | | | 717/124 |
| 2008/0126653 A1 | 5/2008 | King et al. | |
| 2008/0139195 A1 | 6/2008 | Marsyla et al. | |
| 2010/0274850 A1 | 10/2010 | Mace et al. | |
| 2011/0219111 A1* | 9/2011 | Shevenell | G06F 15/173 |
| | | | 709/224 |
| 2012/0009918 A1 | 1/2012 | Wu | |
| 2013/0267179 A1* | 10/2013 | Parekh | H04W 24/08 |
| | | | 455/67.11 |
| 2014/0160941 A1 | 6/2014 | Hui et al. | |
| 2014/0189641 A1 | 7/2014 | Anderson et al. | |
| 2015/0081850 A1* | 3/2015 | Mittal | H04L 65/4084 |
| | | | 709/219 |
| 2015/0082283 A1 | 3/2015 | Smith et al. | |
| 2015/0124891 A1* | 5/2015 | Hwang | H04L 1/0009 |
| | | | 375/257 |
| 2015/0201045 A1 | 7/2015 | Komirelly et al. | |
| 2015/0220426 A1 | 8/2015 | Spektor et al. | |
| 2015/0227355 A1 | 8/2015 | Tripoli et al. | |
| 2016/0232079 A1 | 8/2016 | dos Santos et al. | |
| 2017/0010889 A1* | 1/2017 | Spektor | G06F 11/3672 |
| 2017/0339630 A1 | 11/2017 | Ketonen et al. | |
| 2017/0366983 A1* | 12/2017 | Gunasekara | H04L 43/0811 |
| 2018/0011955 A1* | 1/2018 | Gintis | H04L 43/14 |
| 2018/0124150 A1* | 5/2018 | Myron | H04L 67/025 |
| 2018/0129497 A1 | 5/2018 | Biddle et al. | |
| 2018/0293158 A1 | 10/2018 | Baughman et al. | |
| 2018/0365133 A1 | 12/2018 | Mitchell et al. | |
| 2018/0367940 A1 | 12/2018 | Kwong et al. | |

OTHER PUBLICATIONS

Office action for U.S. Appl. No. 15/622,752, dated May 25, 2018, Kwong, "Distributed Testing of Wireless Networks", 11 pages.

Office Action for U.S. Appl. No. 15/338,069, dated May 4, 2018, Myron, "Remote Access of Cellular Communication Devices for Software Development and Testing", 27 pages.

Office action for U.S. Appl. No. 15/622,752, dated Jan. 18, 2018, Kwong, "Distributed Testing of Wireless Networks", 10 pages.

Office action for U.S. Appl. No. 15/338,069, dated Jan. 22, 2018, Myron, "Remote Access of Cellular Communication Devices for Software Development and Testing", 22 pages.

PCT Search Report and Written Opinion dated Jan. 29, 2018 for PCT Application No. PCT/US17/56796, 13 pages.

Office Action for U.S. Appl. No. 15/622,697, dated Jul. 5, 2018, Mitchell, "Continuous Integration Testing for Network-Based Applications", 18 pages.

Non Final Office Action dated Jan. 7, 2019 for U.S. Appl. No. 15/622,752 "Distributed Testing of Wireless Networks" Kwong, 12 pages.

PCT Search Report and Written Opinion dated Sep. 18, 2018 for PCT Application No. PCT/US18/34937, 13 pages.

Office Action for U.S. Appl. No. 15/622,697, dated Jun. 11, 2019, Mitchell, "Continuous Integration Testing for Network-Based Applications", 31 pages.

Office Action for U.S. Appl. No. 15/622,697, dated Feb. 8, 2019, Mitchell et al, "Continuous Integration Testing for Network-Based Applications", 19 pages.

* cited by examiner

DEVICE-BASED DIAGNOSTIC NETWORK TESTING

BACKGROUND

In many situations, data connectivity is available to mobile devices through cellular communications networks. Cellular communication providers maintain large infrastructures for providing wireless data communications for mobile devices. A cellular services infrastructure includes geographically distributed base stations as well as centralized communication services.

For management of a large services infrastructure such as this, a provider may use a network fault management system to monitor and respond to network outages, impairments, and other malfunctions. A network fault management system can be configured to receive information from different parts of a network infrastructure and to present information regarding network status to network administrators.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
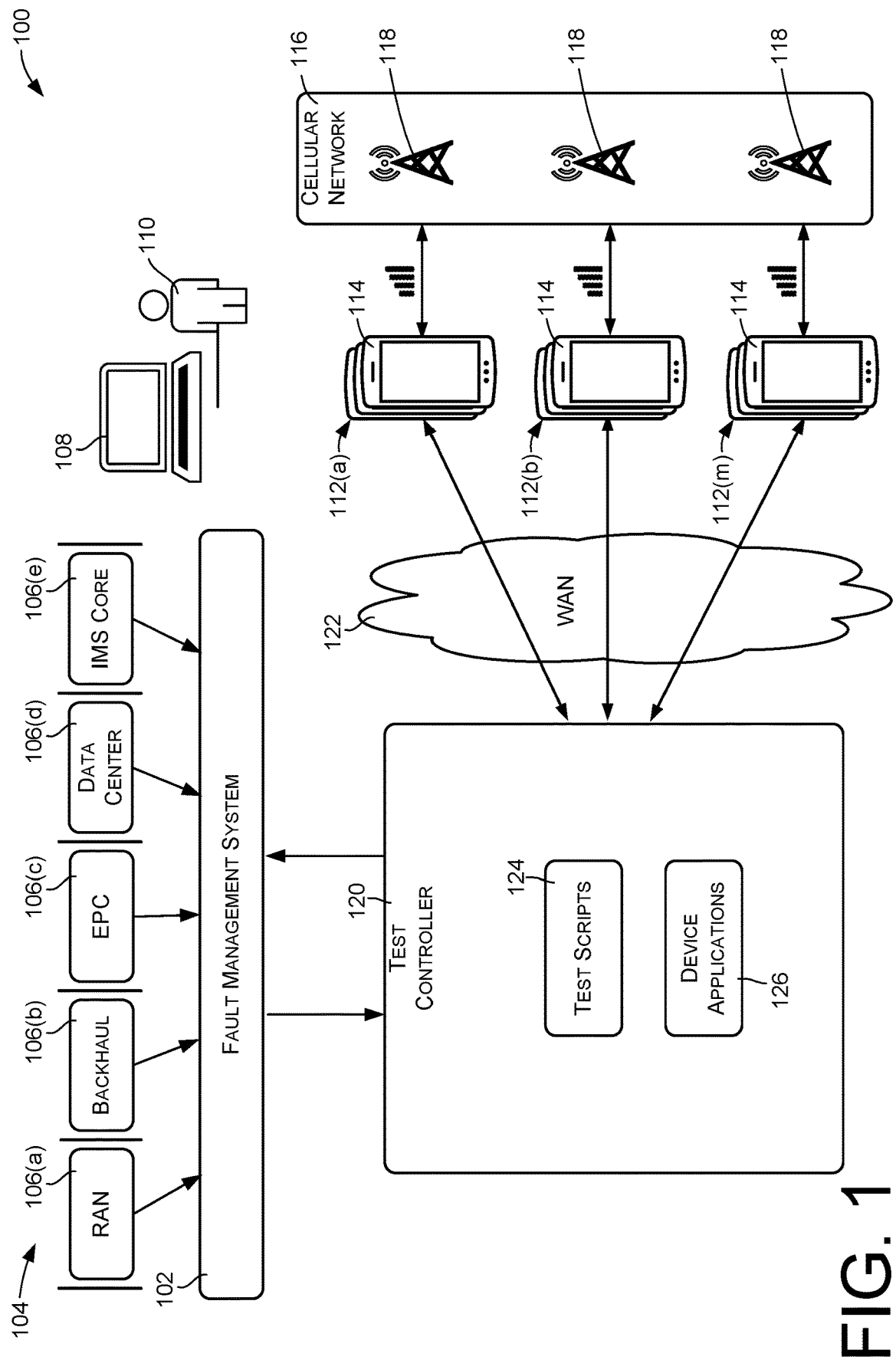
FIG. 1 is a block diagram of an example configuration in which a fault management system is used to respond to faults in a cellular communications network infrastructure.

The described implementations provide devices, systems, and methods for fault management in a cellular communications network. A network fault management system is configured to receive communications from various parts of a cellular network communications infrastructure. The network fault management system is further configured to respond to certain types of network faults by initiating tests that are performed using consumer-type communication devices provisioned and set up to be used as test devices in the cellular communications network.

The communication devices may be the same brands and models that are sold to consumers, and may include smartphones, tablet computers, wearable computers, hotspots, and other devices, including both mobile and stationary devices, that have cellular communication capabilities. In some cases, the communication devices may include prototypes or may run software that is in development and/or that has not yet been released. The cellular communication devices can be distributed geographically within the service area of the cellular communications network, and each of multiple locations can have more than one such device.

The network management system of the cellular communications network receives fault data from multiple parts of a cellular network infrastructure. For example, the network management system may receive fault data from components of the cellular network's RANs (Radio Access Networks), backhauls, EPCs (Evolved Packet Cores), data centers, and IMS (IP Multimedia Subsystem) core. The data may identify faults, or the data may be analyzed to detect faults.

Upon identifying a fault, the network management system selects a test, from multiple available tests, that may aid in diagnosing the network issue that raised the fault. The network management system then communicates with a device test controller, requesting the device test controller to run the selected test on one or more of the provisioned communication devices. The device test controller accesses debug interfaces of the devices, through their USB (Universal Serial Bus) interfaces, to perform the requested test and to return results to the network management system. The network management system may analyze the results, take further actions to diagnose the network issue, and/or may present test results and related data through a management console to a network administrator.

In some cases, a test may involve commanding one or more of the cellular communication devices to execute an application. The application might be one that relies, for at least a portion of its functionality, on communicating through the cellular communications network. The application may in some cases be a consumer application that is commercially available to users for installation and use on their personal wireless devices. In some cases, the tests may involve executing multiple different consumer applications on one or more cellular communication devices to test for compatibility with the cellular communications network and to test functions that rely on cellular network communications. For example, different applications might rely on different servers for their operation, and running the different applications may reveal whether any of those servers, or their associated infrastructure, are malfunctioning.

After an application has been initiated on a communication device, the test controller continues to communicate through the debug interface of the device to obtain performance metrics relating to execution of the application on the device. For example, the test controller may determine the time for the application to load and be ready for user input. The time to load for certain applications may be dependent on network availability, latency, and/or speed, and the time to load may therefore serve as an indication of network availability or performance. As another example, the test controller may send commands to simulate user input on the cellular device, instructing the application to perform a function that relies on cellular network availability, latency, and/or speed, and may measure the time it takes the application to perform that function. Again, this time may be considered a measure of cellular network availability or performance.

In some cases, a test may involve executing an application that has been designed for the specific purpose of testing conditions of the cellular communications network, such as by testing and reporting data transfer speeds, latency, signal strength, etc. In some cases, such an application may comprise a variation of a production application that has been modified for purposes of testing and/or debugging.

In addition to selecting an appropriate test, the network fault management system may select which of multiple available cellular communication devices should be used for testing. The selection may be made on the basis of device model, device operating system, the geographic location of the device, device type, device capabilities, etc. In some cases, the network fault management system may use multiple cellular communication devices to perform the same or different tests.

Device-based testing such as this may be performed in addition to other diagnostic techniques conducted by the fault management system. Diagnosing network performance using widely used consumer devices simulates experiences of real users, and is therefore a relatively reliable way to determine actual network performance. In some cases, this type of cellular network testing may detect issues that would otherwise be difficult to find.

FIG. 1 illustrates an example configuration 100 for fault management in a cellular communications network. The configuration 100 uses banks of consumer devices, such as models of devices commonly used by subscribers of the cellular communications network, to perform diagnostic network testing under the direction of a fault management system.

FIG. 1 shows a fault management system 102 as part of a cellular communications network infrastructure 104 (referred to herein as the infrastructure 104), such as may be implemented by a cellular services provider. The fault management system 102 is configured to receive communications from multiple parts and components of the infrastructure 104. For purposes of illustration, these parts and components, referred to collectively as network elements 106, are represented as a RAN (Radio Access Network) 106(a), a Backhaul 106(b), an EPC (Evolved Packet Core) 106(c), a data center 106(d), and an IMS (IP Multimedia Subsystem) Core 106(e). In actual implementation, the infrastructure 104 may have multiple instances of any of the illustrated network elements 106 and/or other elements that are not shown. The infrastructure 104 may be distributed over a very large region, such as over an entire country or a portion of a country. The infrastructure 104 may implement a GSM (global system for mobile communications) network, as one example.

The network elements 106 represent many types of operational equipment that support a cellular network, such as servers, routers, firewalls, hubs, switches, and so forth. Many of these elements communicate over a non-cellular IP (Internet Protocol) network for purposes of control and reporting. Most relevant to this discussion, multiple components of the infrastructure 104 communicate status information to network management hosts such as the fault management system 102. Status information can include faults, performance metrics, conditions, and so forth. Status information can be communicated using protocols such as SNMP (Simple Network Management Protocol), EMS (Element Management System), and MMS (Manufacturing Message Specification).

The fault management system 102 may be associated with a management and reporting console 108, which a network administrator 110 can use to monitor network conditions and events, and to implement corrective actions. The fault management system 102 may be configured to send notifications of faults to the administrator 110 or to other personnel of the cellular service provider. In addition, the fault management system 102 may be configured to automatically perform various types of diagnostic testing and fault corrections.

The configuration 100 includes multiple device banks 112 that may be used in conjunction with the fault management system for network testing and diagnosis. For purposes of discussion, FIG. 1 shows device banks 112(a) through 112(m). In some embodiments, a different device bank 112 may be located in each of multiple geographic locations.

Each device bank 112 comprises one or more wireless communication devices 114, which may be referred to in the following discussion as test devices 114. The test devices 114 are provisioned to operate as part of a wireless, cellular communications network 116 (referred to herein as the cellular network 116) implemented by the infrastructure 104. For purposes of illustration, the test devices 114 are shown as communicating wirelessly with base stations or other access points 118 of the infrastructure 104, which are represented in FIG. 1 here as communication towers. Accordingly, the test devices 114 can communicate using wireless cellular communication signals with and over the cellular network 116. The cellular network 116 may in turn allow the test devices 114 to communicate with and through wide-area networks such as the Internet.

The test devices 114 may include any types of devices that are configured for use in conjunction with the cellular network 116, including smartphones, tablet computers, laptop computers, wearable devices, control devices, automation devices, etc. Furthermore, the test devices 114 may comprise consumer devices of brands and models that are sold, leased, or otherwise provided for use on the cellular network 116. Such test devices may include models that are currently available to consumers, models that are in development for future release to consumers, and "legacy" models that are no longer manufactured, produced, or sold, but which may still be in use by consumers. In some cases, the test devices 114 of each bank 112 may include devices of different types, models, or configurations, and may be generally representative of devices that are in use on the cellular network. In some cases, the test devices of a bank 112 may include one or more pre-production or prototype devices, or devices running software that is in development but which has not yet been released to the public. In some cases, a bank 112 may include development tools such as devices, boards and/or software that are designed for evaluation and prototype development. In some cases, a bank 112 may include devices having custom builds of purpose-built chipsets designed for the specific purpose of testing.

The configuration 100 has a test controller 120 that communicates with the test devices 114 using one or more data communications channels that do not rely upon the cellular communication infrastructure 104. The test controller 120 may be a computer or a bank of computers that are located geographically at a different location than at least some of the test devices 114. The test controller 120 may be configured to communicate with the test devices 114 over a wide-area network (WAN) 122 such as the Internet. The test devices 114 are connected to the wide-area network 122 using communication capabilities and interfaces other than the cellular communication interfaces of the test devices 114.

In some embodiments, one or more of the test devices 114 might have integrated network communication interfaces, such as Wi-Fi or Ethernet interfaces, for communications through the wide-area network 122 with the test controller 120. In other embodiments, as will be described with reference to FIG. 2, the test devices 114 may communicate over the wide-area network 122 through interface devices that connect to wired USB ports of the devices 114. In some embodiments, communications between the test controller and the test devices 114 may use TCP-based ADB communication channels that correspond respectively to the test devices 114. Generally, communications between the test controller 120 and the test devices 114 do not utilize or rely upon cellular communications capabilities of the test devices 114, and can therefore test independently of the cellular network 116.

The test controller 120 is configured to perform tests using test devices 114 by sending commands and receiving data through instrumentation interfaces of the test devices 114. The instrumentation interfaces, also referred to as debug interfaces, accept commands that control configuration and operation of the devices 114. Commands can also simulate user input. Commands can similarly request data indicating responses and output of other applications that execute on the test devices, including output and status of user interfaces. Commands can also request information regarding states, conditions, and configurations of the test devices, regarding resources, and regarding the applications that are executing on the test devices 114.

In the described embodiment, at least some of the test devices 114 operate using any one of several variants of the Android operating system, including variants intended for phones, tablets, wearable devices, laptop computers, controllers and automation devices, etc., and including variants from multiple manufacturers. As an example of a debug interface, the Android operating system supports a logical interface, accessible through a wired USB port of a device, that can be used for debugging and development. The interface, referred to as the Android Debug Bridge or ADB interface, allows use of a command/query language and syntax to interact with Android-based devices, allowing control of the devices for development and testing. ADB also includes a communication stack that facilitates communications between an external device (in this case the test controller 120) and a device that is running the Android operating system (in this case a test device 114).

The test devices 114 may also include devices using other operating systems, which may have their own respective types or variants of debug or remote instrumentation interfaces.

Figure 2:
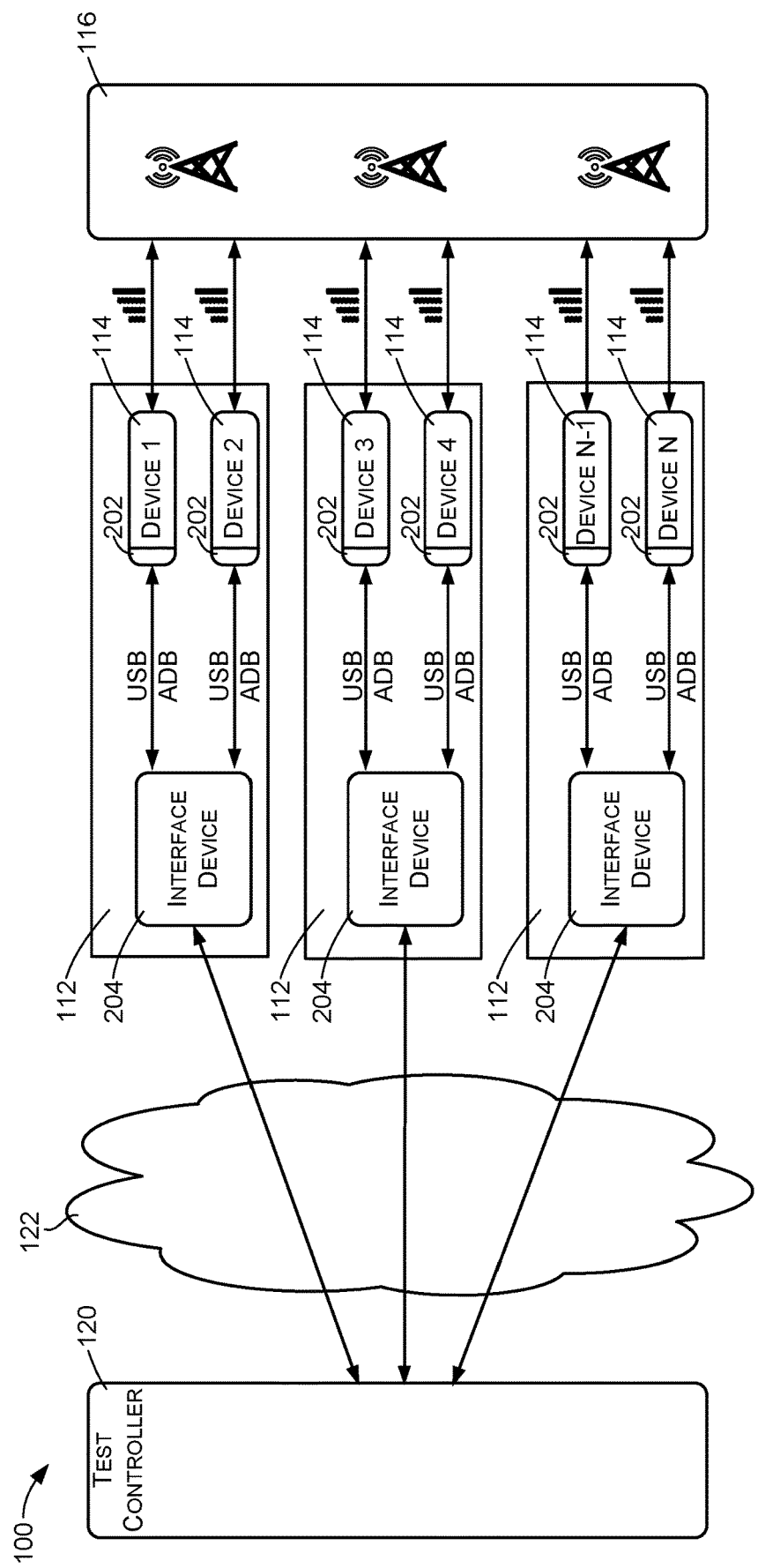
FIG. 2 is a block diagram showing further details of the example configuration shown in FIG. 1.

Although various elements of FIGS. 1 and 2 are shown and described as being discrete devices or components for purposes of discussion, any of the illustrated computing elements may in practice comprise one or more physical, virtual, or otherwise abstracted cluster or network of machines and/or devices. For example, although the test controller 120 is described as a single entity, the term "test controller" is intended to reference any one or more computing devices, including physical devices and virtual computing units, and including network-based devices that are commonly referred to as being in the cloud.

The test controller 120 may in some embodiments have access to multiple performance or availability test scripts 124, each of which represents or implements a test procedure that can be executed against any of the test devices 114. More specifically, each test script 124 specifies a sequence of operations to be performed with respect to a test device 114. Operations may include loading and initiating applications, simulating user input, receiving or detecting user interface output, evaluating system resources or other resources being used by the device or an application executing on the device, receiving output of applications, and so forth.

The test scripts 124 may include or define tests that depend upon capabilities and performance of the infrastructure 104. For example, a test may monitor the performance of an application running on the test devices 114. As a more specific example, a test may comprise initiating an application on a device 114, where the application is one that uses data from a remote server, and where the remote server is accessed by the application via the cellular network 116. The test may measure response times of the application, such as the time for the application to load and be ready for user input or the time to respond to a simulated user command Tests may also obtain other data relating to the application, such as outputs of the application. In some cases, tests may query and obtain operating parameters, metrics, and other information regarding a test device 114, such as memory usage, processor usage, identifications of running applications, communication latencies, etc.

The test controller 120 may store or have access to one or more device applications 126 that can be installed on the test devices 114. In some cases, the device applications 126 may include applications that are available for consumer use, such as applications that can be obtained from Internet-based application stores or markets, and which are not necessarily designed to measure cellular network performance. The applications 126 can be selected as ones that exhibit one or more response times that depend upon performance of the cellular network 116, such as its availability, latency, and/or speed.

Note that in some cases, the device applications 126 may be downloaded and installed by a test device 114 from an Internet-based or other network-based application storefront or market, rather than being installed directly by the test controller 120. That is, a test script 124 may include commands that cause the devices 114 to access such a storefront or market through the cellular network 116, and to download and install one or more applications from the storefront or market.

In operation, the fault management system 102 receives various types of communications from different network elements 106 of the infrastructure 104, some of which may indicate faults. In some cases, the communications may explicitly identify faults. In other cases, the fault management system 102 may analyze data received in the communications to identify faults. As a simple example, the fault management system 102 may obtain an operational metric from a network element 106 and may compare the operational metric to upper and lower thresholds. If the operational metric is outside the range defined by the upper and lower thresholds, the fault management system 102 may identify this condition as a fault.

Generally, a fault in this environment is any state or condition that might need to be investigated, diagnosed, addressed, and/or corrected. Malfunctions, outages, and out-of-tolerance metrics are examples of faults. Further examples include excessive response latency, timeouts, inaccurate or missing data, etc.

In response to identifying a fault, the fault management system 102 selects and initiates one or more previously defined test procedures. In the environment of FIG. 1, such test procedures are implemented or represented by the test scripts 124.

The selection of a test procedure is based on the particular fault that was identified. That is, network administrators can configure the fault management system 102 to associate certain test procedures with certain types of faults.

In some cases, the selected test procedure is one that tests the cellular network 116 using one or more of the test devices 114. For example, the test procedure may involve commanding a test device 114 to execute one of the applications 126 that relies on communications through the cellular network 116 for optimal operation. For example, the application may be one that relies on access to a server or service through the cellular network 116.

Performing or initiating the test procedure may in some cases be performed by directly requesting the test controller 120 to perform the test procedure. In some cases, the fault management system 102 may send a request that identifies one of the test scripts 124. In other cases, the fault management system 102 may send a request that contains a test script. Upon receiving a request such as this from the fault management system 102, the test controller 120 executes the specified test procedure or test script 124.

The test procedure may include obtaining various data such as performance metrics about the test devices 114 and/or the application that the test devices 114 have been commanded to execute. As one example, a test procedure may measure the amount of elapsed time from (a) issuing a command to install and execute an application to (b) the time that the application is subsequently ready for user input.

After or during the test, the fault management system 102 receives test result information from the test controller 120. Upon receiving test result information, the fault management system 102 analyzes the information to create further results, and/or may use the information to determine other test procedures to perform. Results of the test procedure, and/or of testing in general, may be reported to the network administrator 110, such as by displaying result information graphically on the console 108. The fault management system 102 may also, or alternatively, notify appropriate service personnel of a detected fault and of any information gleaned from testing using the test devices 114.

In some implementations, device banks may be located in multiple locations throughout the geographic coverage areas of the cellular network 116, and made continuously available for use in testing. The fault management system 102 may perform testing using any or all of these test device banks, which may allow the fault management system 102 to determine a geographic area of a detected fault. For example, it could be that tests of devices in an area served by a particular data center show degraded network performance, while tests of devices in other areas show normal network performance. Alternatively, in some cases the fault management system 102 may identify a fault in a particular geographic region, and thus select a device bank that is within that region for further testing.

There may also be situations in which it is appropriate to perform tests using a specific type or model of device. For example, certain types of devices such as home control devices may have unique network needs and may therefore be more appropriate for testing certain parts of the cellular network 116.

In some environments, the fault management system 102 may select multiple test procedures to be performed in response to detection of a fault. Furthermore, multiple test procedures may be executed concurrently, on different devices, in order to shorten the overall time for executing all of the test procedures and for diagnosing problems.

FIG. 2 illustrates further details of the configuration 100 in an example implementation. In particular, FIG. 2 illustrates details regarding how communications are implemented between the test controller 120 and the test devices 114.

Each device bank 112 has one or more test devices 114. In some embodiments, each device bank 112 may have an identical mix of device brands, models, types, and/or configurations. In other environments, different banks 112 may have respectively different combinations of brands, models, types, or configurations of devices.

Each test device 114 of a bank 112 has a wired communication port 202 such as a USB (Universal Serial Bus) port. In addition, each test device 114 implements a logical control interface that can be accessed through the USB port for interacting with and controlling the test device 114. In certain embodiments, the logical control interface may comprise an ADB (Android Debug Bridge) interface. In other embodiments, logical control interfaces may support remote debugging connections and protocols other than ADB.

Within each device bank 112, each test device 114 is connected by a wired USB connection to an interface device 204. Each interface device 204 may comprise a relatively inexpensive diskless, single-board computer or controller having an Ethernet network port and one or more other wired communication ports such as USB (Universal Serial Bus) device ports. Each interface device 204 may be configured and programmed by way of a code image that is stored on a removable memory card. For example, an interface device 204 may have a slot into which a removable SD memory card is inserted, and the code image for the interface device 204 may be stored on the SD memory card. The interface device 204 may be easily reconfigured by changing its memory card. Each device bank 112 may include one or multiple interface devices 204, and each interface device 204 may support any number of test devices 144.

In the example shown by FIG. 2, each interface device 204 is connected to a corresponding test device 114 through the wired communication port 202 of the test device 114. Specifically, each interface device 204 is connected by USB cables to USB communication ports 202 of two test devices 114, using respective USB communication ports (not shown) of the interface device 204.

The test controller 120 has a network interface or adapter (not shown), such as an Ethernet adapter or Wi-Fi interface, that enables communications through the wide-area network 122. Each interface device 204 similarly has a network interface (not shown), such as an Ethernet adapter or Wi-Fi interface, that is connected to enable communications through the wide-area network 122. As mentioned, the wide-area network 122 may comprise or include the Internet in some embodiments.

The test controller 120 is configured to communicate through its network interfaces and the wide-area network 122 with the respective interface devices 204. Each interface device 204 may be configured to automatically establish a VPN (Virtual Private Network) communication channel with the test controller 120, and within the resulting virtual network to establish a TCP (Transport Control Protocol) connection with the test controller 120. ADB communications can then be conveyed between the test controller 120 and the interface devices 204 over TCP connections between the test controller 120 and the interface devices 204. An interface device 204 at a particular location is configured to relay ADB communications between the test controller 120 and the test devices 114 at that location. This results in an end-to-end communication channel between the test controller 120 and each of the devices 114. Each channel extends from the test controller 120 to one of the test devices 114 via one of the interface devices 204 and the USB port 202 of the test device 114.

In some embodiments, the interface devices 204 may be configured to execute the test scripts 124 of FIG. 1. In these embodiments, the test controller 120 may send a test script 124 to each of the interface devices 204. Upon receiving a test script 124, the interface device 204 executes the operations specified by the test script 124, obtains resulting data, and sends the data back to the test controller 120.

Figure 3:
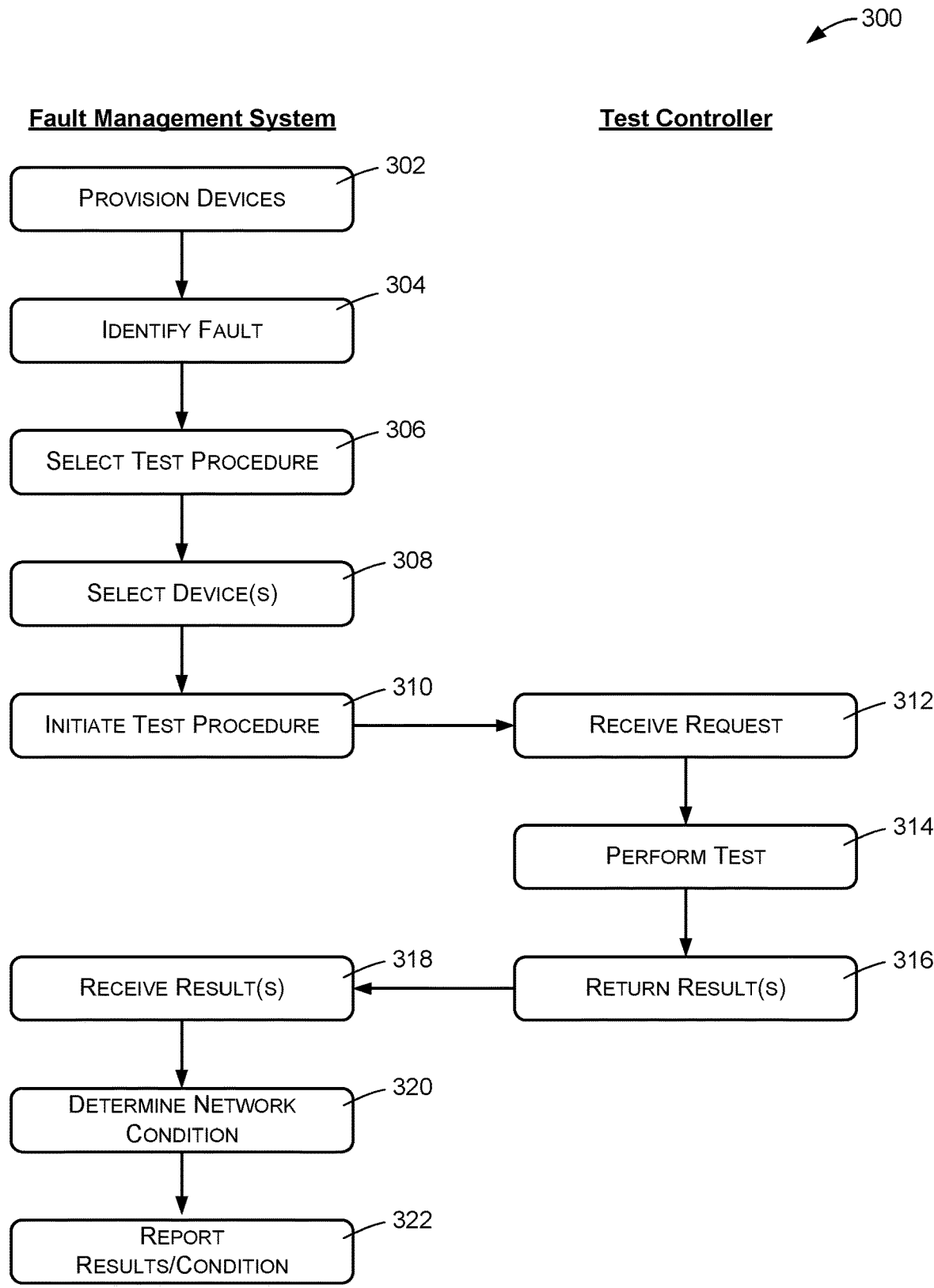
FIG. 3 is a flow diagram illustrating an example method fault management in conjunction with a cellular communications network.

FIG. 3 illustrates an example method 300 for network management and/or reporting. The example method 300 may be performed in the environment described above with respect to FIGS. 1 and 2. In this environment, the actions of FIG. 3 may be performed by the fault management system 102 and the test controller 120. Actions performed by the fault management system are shown on the left side of FIG. 3 and actions performed by the test controller 120 are shown on the right side of FIG. 3. In other environments, the illustrated actions may be performed by any combination of one or more computers and/or other components, not limited to the components shown in FIGS. 1 and 2.

An action 302 comprises provisioning multiple test devices for communicating as part of a cellular communications network. The test devices may comprise devices of one or more models or types that are used in conjunction with the cellular communications network and that are configured to communicate using the cellular communications network, such as devices that have been or will be commercially available to users of the cellular communications network. In some cases, the test devices may be located at various locations within the service areas of the cellular communications network, so that at least one of the test devices is located in each of multiple geographic areas.

In addition to cellular communication capabilities, the test devices may also have non-cellular communication interfaces. For example, the test devices may have wired communication ports such as USB ports. In addition, the test devices may support logical control interfaces at the wired communication ports. For example, a test device may have a physical USB communication port and may also implement a logical control interface via the USB communication port. In certain environments, the logical control interface may comprise an ADB interface.

An action 304 comprises identifying a fault in an infrastructure of the cellular communications network. The fault may be identified by a fault management system, for example, in response to receiving a communication from a component of the cellular network infrastructure. In some cases, the received communication may specify the fault. In other cases, the communication may specify data that is analyzed to detect and identify a fault.

An action 306 comprises selecting a test procedure that will aid in confirming and/or diagnosing the identified fault. Generally, a fault management system may be configured to recognize and respond to different faults that are possible within the cellular network infrastructure. For each fault, the fault management system may be set up to respond in a particular way. In accordance with the techniques described herein, certain faults may be associated with corresponding test procedures, and when one of these fault is detected the fault management system selects the corresponding test procedure.

The available test procedures may be defined by network administrators. In some cases, a test procedure may involve testing with one or more of the test devices. In these cases, there may be a previously supplied test script that is associated with the test procedure, which may include executing the test script against one or more of the test devices. Generally, the action 306 may comprise selecting a test procedure from multiple available test procedures, based at least in part on which of multiple possible faults is identified.

In some embodiments, an action 308 may be performed, comprising selection of one or more of the test devices to be used for testing in conjunction with the selected test procedure. The selection of test devices may be made based upon various factors. For example, depending on the nature of the fault a certain type of test devices (such as automotive communication devices, as an example) may be selected. As another example, a particular model or manufacturer of test devices may be selected. As another example, devices having certain hardware specifications or running specified operating systems may be selected.

As yet another example, in some cases the identified fault may be associated with a geographic location. For example, the fault may relate to a specific component that is at a known location. In this case, test devices may be selected based on their geographic proximity to that geographic location. In some cases, it may be desirable to select devices that are near the geographic location. In some cases, it may be desirable to also select test devices at other locations, to determine whether the effects of the fault are being seen in other areas.

An action 310 comprises initiating the selected test procedure. In the embodiment of FIGS. 1 and 2, this may be accomplished by requesting the test controller 120 to execute a specified test script. The fault management system 102 may send a request to the test controller 120, for example, and the request may either contain the test script corresponding to the selected test procedure, or may specify one of the test scripts 124 that are already stored by the test controller 120. In some cases, the request may also identify which subset of the available test devices 114 should be used for testing.

An action 312, which may be performed by the test controller, comprises receiving the request. In response, an action 314 is performed, which comprises execution of the specified test script. This may involve communicating with the specified test devices through their USB ports or other wired and/or non-cellular interfaces. Execution of an example test script will be described below with reference to FIG. 4.

An action 316 comprises returning results of executing the test script to the fault management system. Test results may include various types of data, indicating information such as cellular network speeds, signal strengths, response latencies, application load times, application response times, availability through the cellular network of various servers or services, responsiveness of servers or services, and/or any other information as specified by the test script.

An action 318, performed by the fault management system, comprises receiving the test results. An action 320 comprises determining a condition of the cellular communications network based at least in part on the information specified by the received test results. For example, the action 320 might comprise determining that the cellular communications network is impaired in some way, or that some geographic portion of the cellular communications network is impaired. As another example, the action 320 might comprise determining that a particular server or service of the cellular communications network is malfunctioning.

An action 322 comprises reporting test results and/or determined conditions, where the results or conditions are based at least in part on the information received from the test controller. The action 322 may comprise reporting the results of the test procedure. In some cases the reported results may be based on data obtained from multiple sources, in addition to the data received from the test controller.

Although the method 300 has been described as selecting and executing a single test procedure, in some embodiments the method 300 may be used to select and execute multiple test procedures. For example, in some embodiments the action 306 may comprise selecting multiple test procedures that will aid in confirming and/or diagnosing the identified fault. The action 308 may comprise selecting one or more devices for testing in conjunction with each of the selected test procedures, and the action 310 may comprise initiating the multiple test procedures using the selected devices. Similarly, the actions 312, 314, and 316 may be performed with respect to each of the multiple selected test procedures. In some cases, the multiple selected test procedures may be executed concurrently, on respective devices, in order to speed testing. As an example, after initiating a first test procedure, a second test procedure may also be initiated and executed concurrently with the first test procedure, where the first and second test procedures use respectively different devices.

Figure 4:
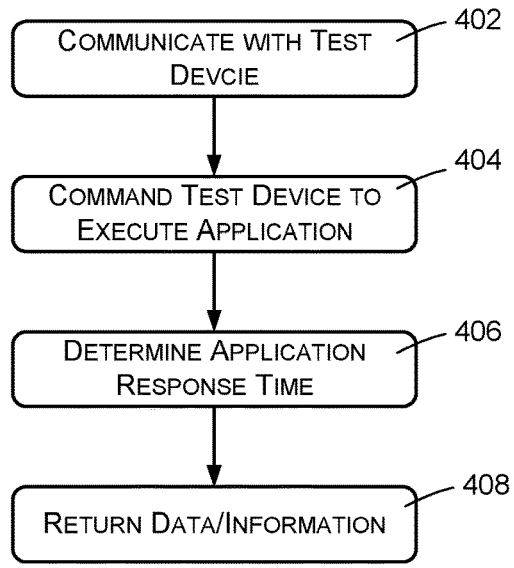
FIG. 4 is a flow diagram illustrating an example method of performing testing in conjunction with the example method of FIG. 3.

FIG. 4 illustrates an example method 400 that might be performed to test a cellular communications network using a test device such as described above. In the environment of FIGS. 1 and 2, the example method 400 may be performed by the test controller 120, or by the test controller 120 in conjunction with the interface devices 114. Generally, however, the method 400 may be performed by any component or combination of components that are able to access the debug interfaces of the test devices or otherwise communicate with the test devices 114.

An action 402 comprises communicating with a test device through a non-cellular communication interface of the test device, such as a USB interface, to perform the test procedure. In some cases, this may include communicating through a wide-area network other than the cellular network, such as through the WAN 122 of FIG. 2, where each test device 114 is configured by means of a corresponding interface device 204 to also communicate through the WAN 122.

An action 404 comprises commanding the test device to execute an application. In some cases, the application may be one that relies at least in part on communicating through the cellular communications network. In some cases, the application may comprise a consumer application that is available for installation and use on consumer-owned devices. In addition, or alternatively, the application may be an application that uses services of a network-based server, and which uses the cellular network to communicate with the server.

An action 406 comprises determining a response time of the application. For example, the action 406 may comprise receiving data from the test device, through the logical debug interface of the test device. The data may specify information regarding execution of the application on the test device. The data may include a response time of the application, or may specify information allowing the test controller to determine the response time of the application. The response time may, for example, be the time that it takes for the application to load and be ready for user input. As another example, the response time may be the elapsed time from providing an input to the application to detecting a corresponding output of the application.

An action 408 comprises returning data and/or information to the fault management system, where the returned data specifies results of the testing, and in some cases including one or more response times and/or latencies of the application.

The test controller 120 may perform the method 400 for multiple test devices that have been specified by the fault management system.

Figure 5:
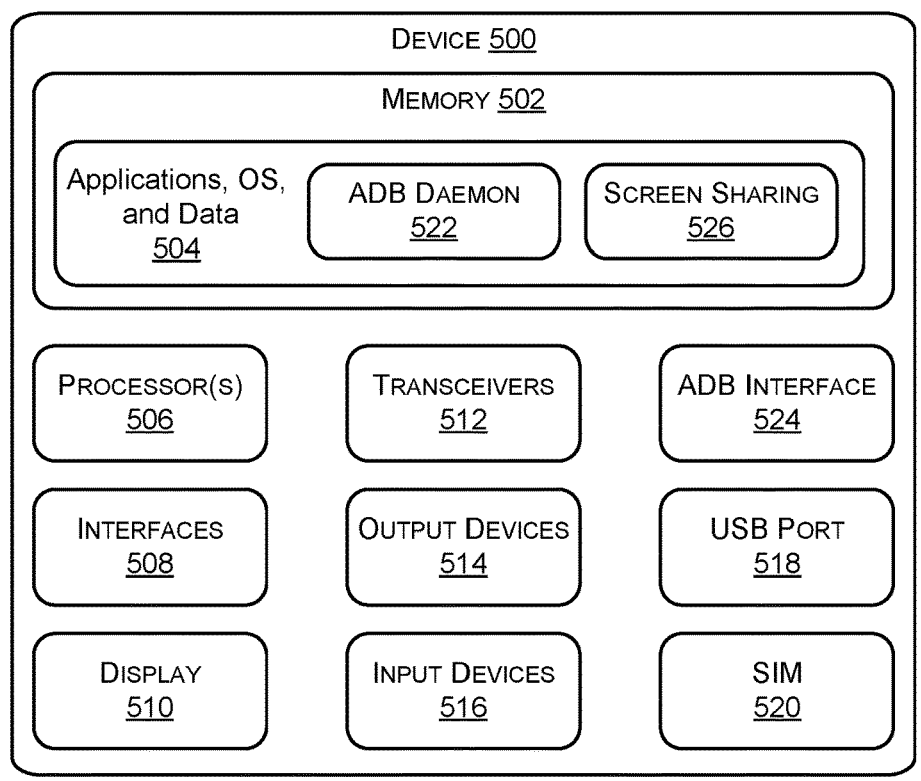
FIG. 5 is a block diagram illustrating example high-level components of a test device such as shown in FIGS. 1 and 2.

FIG. 5 illustrates an example communication device 500 in accordance with various embodiments. The device 500 is illustrative of a test device 114.

The device 500 may include memory 502, which may store applications, an operating system (OS), and data 504. The device 500 further includes processor(s) 506, interfaces 508, a display 510, radio transceivers 512, output devices 514, and input devices 516.

In various embodiments, the memory 502 comprises one or more machine-readable media, which may in turn include volatile and/or non-volatile memory. The memory 502 can also be described as non-transitory computer storage media and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 500.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. The interfaces 508 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 510 may comprise a liquid crystal display or any other type of display commonly used in telecommunication devices or other portable devices. For example, the display 510 may be a touch-sensitive display screen, which may also act as an input device or keypad, such as for providing a soft-key keyboard, navigation buttons, or the like.

In some embodiments, the transceivers 512 include any sort of transceivers known in the art. For example, the transceivers 512 may include radios and/or radio transceivers and interfaces that perform the function of transmitting and receiving radio frequency communications via an antenna, through a cellular communications network of a wireless data provider, such as the cellular network 116 of FIG. 1. The radio interfaces facilitate wireless connectivity between the device 500 and various cell towers, base stations and/or access points.

In some embodiments, the output device 514 include any sort of output devices known in the art, such as a display (already described as display 510), speakers, a vibrating mechanism, or a tactile feedback mechanism. The output devices 514 also include ports for one or more peripheral devices, such as headphones, peripheral speakers, or a peripheral display.

In various embodiments, the input devices 516 include any sort of input devices known in the art. For example, the input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 500 may have a USB (universal serial bus) port 518 that provides communications with peripheral devices, and which in the embodiment of FIG. 2 connects to one of the interface devices 204. The USB port 518 may also in some cases serve as a battery charging port.

The device 500 may have a SIM (subscriber identity module) 520, which is a removable smart card used to identify a user of the device 500 to the cellular communication infrastructure 104.

In some embodiments, the Applications, OS, and data 504 may include an ADB daemon 522, which is an application that runs as a background process to respond to ADB commands. The ADB daemon 522 creates and communicates through an ADB interface 524, which is accessible through the USB port 518.

Figure 6:
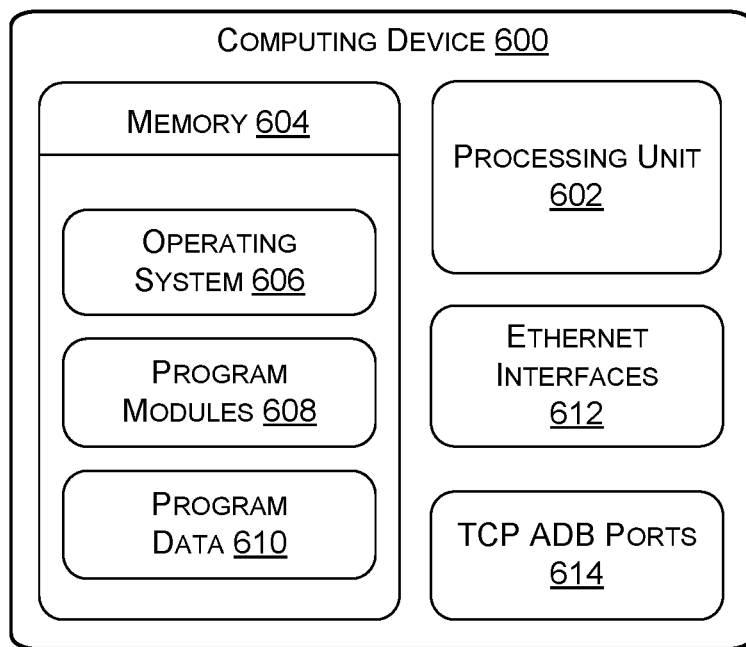
FIG. 6 is a block diagram illustrating example high-level components of a computing device, one or more of which may be used as a test controller in the environment of FIGS. 1 and 2.

FIG. 6 is a block diagram of an illustrative computing device 600 such as may be used to implement the test controller 120. In various embodiments, the computing device 600 may include at least one processing unit 602 and memory 604. Depending on the exact configuration and type of computing device, the system memory 604 may be volatile (such as RAM), non-volatile (such as ROM, flash memory, etc.) or some combination of the two. The memory 604 may include an operating system 606, one or more program modules 608, and may include program data 610. The memory may also include data storage devices (removable and/or non-removable) such as, for example, magnetic disks, optical disks, or tape.

The memory 604 may comprise non-transitory computer storage media. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600.

In various embodiment, any or all of the memory 604 may store programming instructions which, when executed, implement some or all of the function functionality described above as being implemented by the test controller 120.

The computing device 600 may have one or more Ethernet interfaces 612, which may be used for connecting to a wide-area network such as the Internet. The computing device 600 may create and expose multiple TCP-based ADB ports 614 for communications with external devices such as the interface devices 204.

The computing device 600 may have various other elements such as a keyboard, a mouse, a touch-sensitive display, voice input device, etc. Output device(s) such as a display, speakers, a printer, etc. may also be included.

Figure 7:
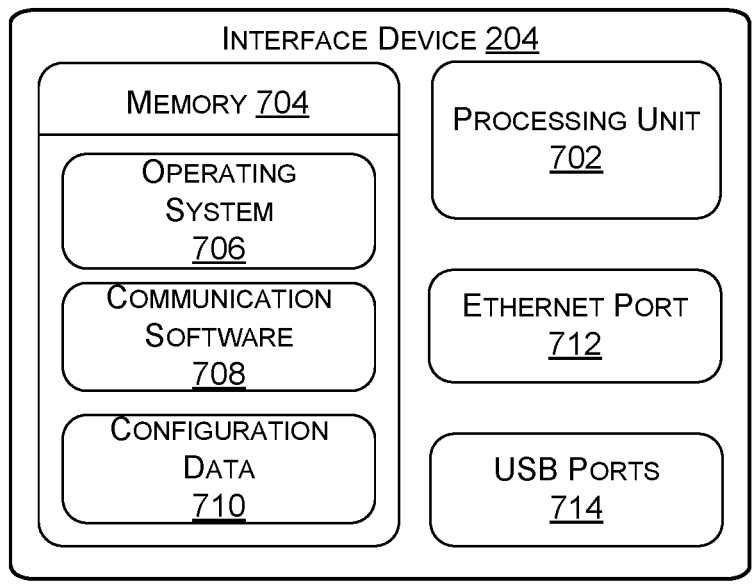
FIG. 7 is a block diagram illustrating a example high-level components of an interface device such as shown in FIG. 2.

FIG. 7 illustrates an example implementation of an interface device 204, and shows basic, high-level components of such as device. The components may include at least one processing unit 702 and associated memory 704. In the described embodiment, the memory includes a removable, non-volatile memory card such as may be implemented using flash memory technologies. Such a removable memory card may be used to store a code image in order to configure operation of the interface device 204.

Generally, the memory 704 comprises non-transitory computer storage media of various types. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology.

In various embodiment, any or all of the memory 704 may store programming instructions which, when executed by the processing unit 702, implement some or all of the function functionality described above as being implemented by the interface device 204.

More specifically, the memory 704 may include an operating system 706 and various other software. As a specific example, FIG. 7 shows communication software 708 such as may be used to communicate with the test controller 120 and the test devices 114. The memory 704 may also contain various types of configuration data 710.

The interface device 204 may have an Ethernet interface 712 for communications with the test controller 120 over a wide-area network such as the Internet. The interface device 204 may have multiple USB ports 714 for communication with the test devices 114.

Although features and/or methodological acts are described above, it is to be understood that the appended claims are not necessarily limited to those features or acts. Rather, the features and acts described above are disclosed as example forms of implementing the claims.

What is claimed is:

1. One or more non-transitory computer-readable media storing computer-executable instructions that, when executed by one or more processors, cause the one or more processors to perform actions comprising:

identifying a fault in an infrastructure of a cellular communications network, wherein the fault is one of multiple possible faults;

selecting, in response to identifying the fault in the infrastructure of the cellular communications network, a test procedure from multiple test procedures based at least in part on which of the multiple possible faults is identified;

selecting a device from a plurality of devices to assist in the test procedure based at least in part on a nature of the fault;

communicating with the device through a non-cellular communication interface of the device to perform the test procedure, wherein the device has been provisioned for data communications using the cellular communications network;

wherein the test procedure includes commanding the device, through the non-cellular communication interface, to execute an application that is available for installation and use on consumer-owned devices, and wherein the application relies at least in part on communicating through the cellular communications network;

receiving data from the device through the non-cellular communication interface of the device, wherein the data indicates a response time of the application; and reporting a result that is based at least in part on the data.

2. The one or more non-transitory computer-readable media of claim 1, wherein identifying the fault comprises receiving a communication from a component of the infrastructure.

3. The one or more non-transitory computer-readable media of claim 1, the actions further comprising performing the test procedure for multiple devices that have been provisioned to communicate wirelessly through the cellular communications network.

4. The one or more non-transitory computer-readable media of claim 3, wherein at least one of the devices is located in each of multiple geographic areas.

5. A method, comprising:
identifying a fault in an infrastructure of a first network, the first network being a cellular communications network, and wherein the fault is one of multiple possible faults;

selecting, in response to identifying the fault in the infrastructure of the cellular communications network, a test procedure from multiple test procedures based at least in part on which of the multiple possible faults is identified;

selecting a device from a plurality of devices to assist in the test procedure based at least in part on hardware specifications associated with the device;

communicating with the device through a second network to perform the test procedure on the first network, wherein the device has been provisioned for data communications using the first network and the second network is a wide area network other than the cellular communications network;

wherein the test procedure includes commanding the device, through the non-cellular communication interface, to execute an application that is available for installation and use on consumer-owned devices, and wherein the application relies at least in part on communicating through the cellular communications network;

receiving data from the device through the non-cellular communication interface of the device, wherein the data indicates a response time of the application; and reporting, via the second network, a result of the test procedure, the result being based at least in part on the data.

6. The method of claim 5, wherein the result includes the response time of the application.

7. The method of claim 5, wherein communicating via the second network is through a non-cellular interface of the device.

8. The method of claim 5, wherein:
at least one of the devices is located in each of multiple geographic areas;
the fault is associated with a geographic location; and the method further comprises selecting the device from the multiple devices based at least in part on geographic proximity of the device to the geographic location.

9. The method of claim 5, wherein the devices are of one or more models that have been commercially available.

10. A system, comprising: one or more processors; non-transitory computer-readable media storing computer-executable instructions that, when executed by the one or more processors, cause the one or more processors to perform actions comprising:

identifying a fault in an infrastructure of a cellular communications network, wherein the fault is one of multiple possible faults;

selecting, in response to identifying the fault in the infrastructure of the cellular communications network, a first test procedure from multiple test procedures based at least in part on which of the multiple possible faults is identified;

selecting a device from a plurality of devices to assist in the test procedure based at least in part on a geographic proximity of the device to a geographic location associated with the fault;

wherein the first test procedure includes testing with a first device that is configured to communicate wirelessly through the cellular communications network; and executing the first test procedure with the first device;

selecting, in response to identifying the fault in the infrastructure of the cellular communications network, a second test procedure from multiple test procedures based at least in part on which of the multiple possible faults is identified, the second test different than the first test; and concurrently with executing the first test procedure, executing the second test procedure with a second device.

11. The system of claim 10, wherein:
initiating the first test procedure comprises requesting a test controller to perform the first test procedure; and the test controller performs the first test procedure by communicating with the device through a non-cellular interface of the device.

12. The system of claim 10, wherein the first test procedure includes commanding the first device to execute an application.

13. The system of claim 12, wherein the application relies at least in part on communicating through the cellular communications network.

14. The one or more non-transitory computer-readable media of claim 1, wherein reporting the result is over the non-cellular communication interface.

15. The one or more non-transitory computer-readable media of claim 1, further comprising:
determining a network condition based at least in part on the data; and
wherein reporting the result includes reporting the network condition.

16. The method of claim 5, wherein the device is connected to the second network via a wired port.

17. The system of claim 10, further comprising receiving via a second network data associated with the test procedure from the device, the second network different from the cellular communications network.

18. The system of claim 10, wherein the first test procedure includes testing with a second device different than the first device, the second device configured to communicate wirelessly through the cellular communications network.

19. The method of claim 5, wherein selecting the device from the plurality of devices to assist in the test procedure is also based at least in part on software installed on the device.

\* \* \* \* \*